United States Patent [19]

Okada et al.

[11] Patent Number: 5,594,494
[45] Date of Patent: Jan. 14, 1997

[54] MOVING PICTURE CODING APPARATUS

[75] Inventors: Osamu Okada, Tokyo; Shigenobu Minami, Ayase; Shoichiro Yamasaki, Tokyo, all of Japan

[73] Assignee: Kabushiki Kaisha Toshiba, Kanagawa-ken, Japan

[21] Appl. No.: 211,724

[22] PCT Filed: Aug. 27, 1993

[86] PCT No.: PCT/JP93/01213

§ 371 Date: Apr. 26, 1994

§ 102(e) Date: Apr. 26, 1994

[87] PCT Pub. No.: WO94/06246

PCT Pub. Date: Mar. 17, 1994

[30] Foreign Application Priority Data

Aug. 27, 1992 [JP] Japan .................................. 4-228572

[51] Int. Cl.⁶ ............................................. H04N 7/14
[52] U.S. Cl. ......................... 348/15; 348/14; 348/17; 348/18; 348/19
[58] Field of Search .............................. 348/13, 14, 15, 348/16, 17, 18, 19, 20, 403, 407, 409, 401, 412, 415; 379/93, 100, 96, 202; 381/56, 59, 92, 122; H04N 7/140

[56] References Cited

U.S. PATENT DOCUMENTS 4,494,144  1/1985  Brown ..................................... 379/100
5,206,721  4/1993  Ashida et al. .......................... 348/15

FOREIGN PATENT DOCUMENTS 59-21186   2/1984   Japan ..................................... 348/15
61-29163   7/1986   Japan .
0043285    2/1987   Japan ............................. H04N 7/14
63-64120   12/1988  Japan .
3-96999    4/1991   Japan .
2123646    2/1984   United Kingdom .

OTHER PUBLICATIONS

*Information and Systems*, Hideyuki Ueno, et al., 1989 Spring National Convention Record, The Institute of Electronics, Information and Communication Engineers, Part 7, pp. 7, 7–74, cover & TOC.
European Search Reprot, dated Jul. 7, 1994.
International Search Report for App. No. PCT/JP93/01213 dated Nov. 6, 1993.

*Primary Examiner*—Jason Chan
*Attorney, Agent, or Firm*—Finnegan, Henderson, Farabow, Garrett & Dunner, L.L.P.

[57] ABSTRACT

A television camera 12 for picking up a subject and producing an video signal, a plurality of microphones 11L, 11R which are arranged so as to be separate from each other and which collect a vocal sound from the subject filmed by the television camera and output audio signals, an estimating circuit 13 for estimating the position of the sound source on the basis of the audio signals obtained from those microphones, and a coding circuit for encoding the video signal for a specific range of picture area centered the sound source position estimated by the estimating circuit with a larger amount of codes than the video signals for the other picture areas so that the picture area for the specific range may have a higher resolution than the other picture areas construct.

13 Claims, 5 Drawing Sheets

MOVING PICTURE CODING APPARATUS

TECHNICAL FIELD

This invention relates to a coding apparatus for encoding video signals, and more particularly to a moving picture coding apparatus which specifies a significant portion in a picture on the basis of the audio signal sent together with the video signal, increases a coded bit rate allocated to the specified picture area, and thereby encodes the picture.

BACKGROUND ART

With the recent advance in communication technology, remote conference systems (television conference systems) and videophone systems available even for the individual have been put into practical use.

In such systems, images and sound are transmitted using communication channels such as telephone circuits, which therefore limits the coded bit rate transmittable per channel. To suppress the amount of picture signal data to less than the upper limit of the coded bit rate, the picture information is encoded before transmission.

Since the coded bit rate transmittable per unit time is insufficient, the coded bit rate for the pictures per frame to ensure natural movements is determined by the transmission rate in transmitting moving pictures.

Generally, coding is effected so that the entire screen may be uniform in resolution. This, however, causes the problem of blurring the picture of the other party's face. Normally, a person does not pay attention to the full screen, but tends to concentrate on a significant portion in the screen. Therefore, with the picture quality of the significant portion being improved, even if the remaining portions have a somewhat low resolution, there is almost no problem in understanding the picture.

Viewed in this light, coding methods have been studied which display the face area of a person, a more important source of information, more sharply than the remaining areas in order to improve the subjective picture quality. One of such techniques proposed is using interframe differential pictures (literature: Kamino et al., "A study of a method of sensing the face area in a color moving-picture TV telephone," the 1989 Electronic Information Communication Society's Spring National Meeting D-92).

With this system, the person talking over the telephone is picked up with a television camera. From the picture signal thus obtained, moving portions in the picture are picked up. The face area of the speaker is estimated on the basis of the picked-up area. A large coded bit rate is allocated to the estimated face area and a small coded bit rate is given to the remaining areas. By performing such a coding process, the person's face area is displayed more sharply than the remaining areas.

In cases where such a face-area-pickup method in a moving-picture TV telephone is applied to a conference system, when moving objects other than the person are picked up unintentionally, or when more than one person is picked up with each showing changes of expression, it is difficult to estimate the face area of the speaker.

As described above, when more than one person is picked up or when moving objects other than a person are picked up, there arises the problem of being unable to extract only the face area of the speaker, the most important factor in a method of picking up the face area in a moving picture.

Accordingly, the object of the present invention is to provide a moving-picture coding apparatus capable of estimating the position of the speaker in the video signal precisely, extracting the area of the speaker in the screen accurately, and thereby sharply displaying the area in which the speaker appears.

DISCLOSURE OF INVENTION

According to the present invention, it is possible to provide a moving-picture coding apparatus in an image transmission system for encoding and transmitting video signals, the apparatus comprising: a television camera for picking up a subject and generating a video signal; microphones separated from each other for collecting the vocal sound from the subject picked-up by the television camera and outputting audio signals; a sound source position estimating circuit for estimating the position of a sound source on the basis of the audio signals from the microphones; and a coding circuit for encoding at a somewhat greater coded bit rate than that for the remaining picture areas the video signal corresponding to the picture area within a specific range centered at the sound source position estimated at the sound source position estimating circuit, so that the picture area within the specific range may have a higher resolution.

With a moving-picture coding apparatus thus constructed, the television camera picks up a subject and outputs a video signal. The microphones arranged separately from each other in front of the subject collect the vocal sound. The sound source position estimating circuit estimates the position of the sound source on the basis of the audio signals collected from a plurality of channels. The coding circuit encodes the video signal from the television camera in a manner that encodes at a somewhat greater coded bit rate than that for the remaining picture areas the video signal for a specific range centered at the sound source position estimated at the estimating circuit, so that the picture area within the specific range may have a higher resolution.

As a result, it is possible to encode mostly the vicinity of the sound source position on the screen at higher resolution, with the result that moving-picture coding can be effected which enables video signals to be encoded so that the speaker may be displayed more sharply. In particular, by matching the picture area within the specific range centered at the estimated sound source position to the range of the subject's face area in the screen, the video signal can be encoded so that the face area of the speaker may have a higher resolution.

BEST MODE FOR CARRYING OUT THE INVENTION

Hereinafter, referring to the accompanying drawings, an embodiment of the present invention will be explained. This invention provides a picture coding apparatus employing a moving-picture coding method which estimates the sound source position on the basis of the audio signals from a plurality of channels, encodes mostly the estimated vicinity of the sound source position, and thereby effects coding so that the speaker may be displayed more sharply.

Figure 2:
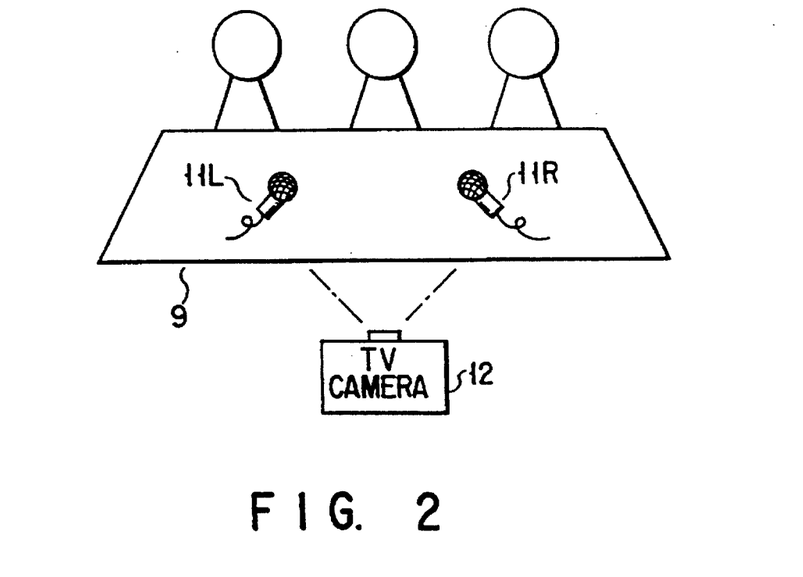
FIG. 2 is a drawing to help explain an embodiment of the present invention, which shows an arrangement of a conference room for a television conference system associated with the present invention.

FIG. 2 shows a schematic layout of a conference room for a television conference system containing a picture coding apparatus of the invention. In the figure, a single camera covers three persons at the conference.

As shown in FIG. 2, on a table 9 at which attendants A1 to A3 sit, two microphones (sound-sensitive means) 11R and 11L are placed laterally at equal intervals so as to surround the speech of the attendants. In front of the table 9, there is provided a television camera 12, which covers the images of the attendants A1 to A3 sitting at the table 9 side by side.

The audio signals from the right and left microphones 11R and 11L and the video signal from the television camera 12 are supplied to a picture estimation coding section 10, which encodes these signals so that they may fall within a specified coded bit rate per screen. The audio signals are also supplied to an audio signal processing system (not shown), which converts them into digital signals, which are then sent together with the encoded video signal to a transmission line. Thus, these signals are transmitted to the other party.

The picture estimation coding section 10, acting as a picture processing system, estimates the position of the speaker's face area on the basis of attendants A1 to A3 covered by the television camera 12, encodes the video signal for the estimated position area with a somewhat greater coded bit rate M(i) than the video signals for the other areas, and encodes the other areas with the remaining coded bit rate M(0). Specifically, the total coded bit rate M(total) per screen is determined. The determined coded bit rate is divided into a coded bit rate (M(i)) allocated to the estimated position area and a coded bit rate (M(0)) allocated to the other areas. This gives: M(total)=M(i)+M(0)

Figure 1:
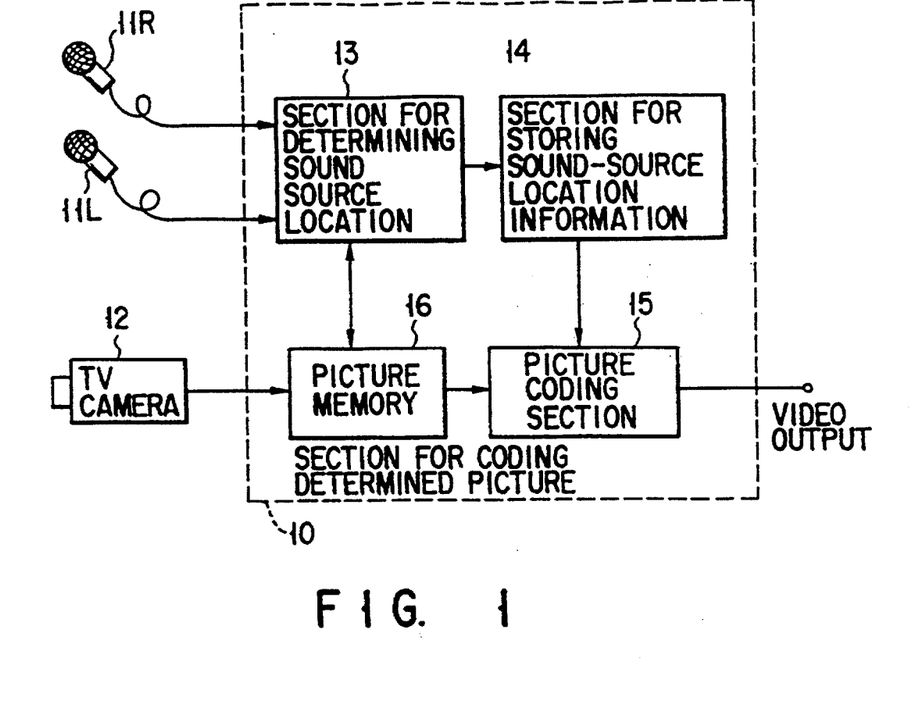
FIG. 1 is a block diagram of a picture coding section in a television conference system according to an embodiment of the present invention.

The picture estimation coding section 10 comprises a sound source position estimating section 13, a sound source position information storage section 14, a picture coding section 15, and an image memory 16. The image memory 16 temporarily holds the picture data in screens obtained by converting the video signal from the television camera 12 into digital form. The image memory has a capacity enough to store a plurality of pictures for image processing and updates the picture data constantly. The sound source position estimating section 13 estimates the position of the sound source. Specifically, the estimating section 13 estimates the position of the speaker on the basis of the audio signal outputs from the microphones 11R and 11L, and simultaneously estimates the sound source position on the picture, or the area of the speaker, on the basis of the position of the left and right microphones 11L and 11R in the picture data stored in the image memory 16. The sound source position information storage section 14 stores information on the sound source position estimated at the sound source position estimating section 13 and information on the time at which the estimation was performed. Here, the time information is externally supplied. Furthermore, the picture estimation coding circuit 10 may be provided with a clock circuit, from which the time information may be supplied.

The picture coding section 15 encodes the picture data stored in the image memory 16 on the basis of the information from the sound source position information storage section 14, and outputs the encoded data. Specifically, the coding section encodes the video signal so that an area centering at the speaker's position may be displayed more clearly. To do this, the picture coding section 15 determines the area in the speaker's position on the picture to be the important coding area on the basis of the information on the speaker's position stored in the sound source position information storage section 14. Then, the coding section allocates the coded bit rate M(i) to the video signal for the important coding area and the coded bit rate M(0) to the video signals for the other areas, and encodes the video signals for the individual areas so that they may fall within the allocated ranges.

Figure 3:
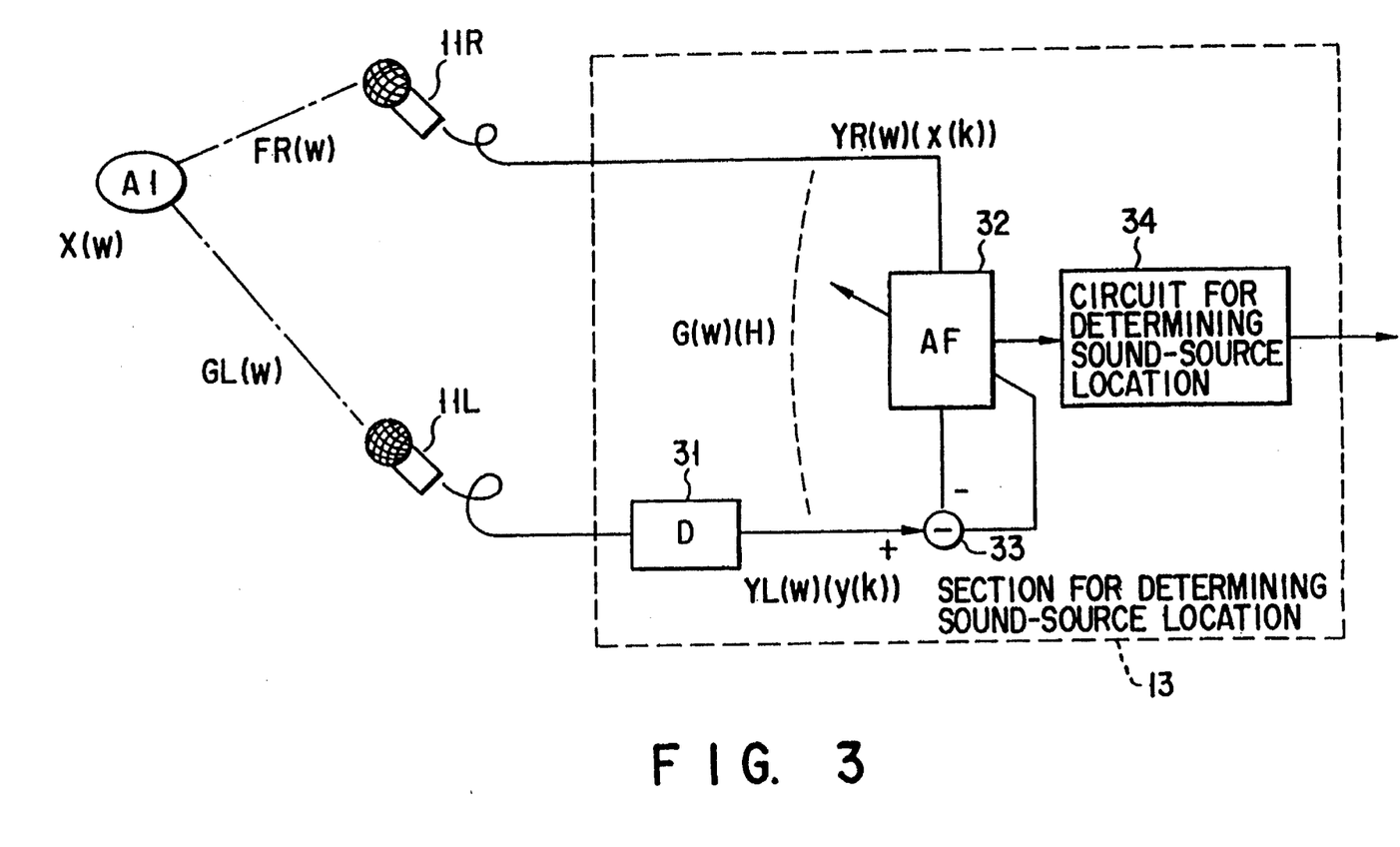
FIG. 3 is a block diagram of the sound source position estimating section of FIG. 1.

The sound source position estimating section 13 comprises a delay circuit 31, an estimating circuit 32, a subtracter circuit 33, and a sound source position estimating circuit 34, as shown in FIG. 3. The delay circuit 31 delays the left-channel audio input signal from the left microphone 11L. The estimating circuit 32 estimates a left-channel audio signal on the basis of the delayed left-channel audio input signal from the delay circuit 31 and the right-channel audio signal from the right microphone 11R. The subtracter circuit 33 receives the delayed left-channel audio signal from the delay circuit 31 and the estimated left-channel audio signal from the estimating circuit 32, and subtracts the estimated left-channel audio signal from the left-channel audio signal to produce the difference signal. When the difference signal is fed back to the estimating circuit 32, the estimating circuit 32 estimates such a left-channel audio signal as allows the difference signal to become zero and outputs the estimated audio signal. This enables the estimating circuit 32 to estimate a left-channel audio signal to be an estimated impulse response series H (k) on the basis of the right-channel audio signal from the right microphone 11R, referring to the delayed left-channel audio input signal. Using the estimated impulse response series H(k) obtained at the estimating circuit 32, the sound source position estimating circuit 34 estimates the position of the sound source.

With the above configuration, the television camera 12 picks up the persons who are present at the conference, and simultaneously vocal sounds are collected by the microphones 11R and 11L on the table 9. The video signal from the television camera 12 is sent to the picture coding section 15, and the audio signals from the microphones 11R and 11L are sent to the sound source position estimating section 13. The sound source position estimating section 13 estimates the position of the sound source on the basis of the audio signals. The estimation result is stored in the sound source position information storage section 14.

Using the latest sound-source position information stored in the sound source position information storage section 14, the picture coding section 15 specifies the area corresponding to the sound source position in the video image on the screen, encodes the area with the preset coded bit rate M(i) and the other areas with the coded bit rate M(0), and transmits the encoded signal. This enables the speaker among the persons who are present at the conference to be displayed at a high resolution on a monitor (not shown) on the reception side.

How the speaker is specified will be explained in more detail.

In FIG. 3, if the vocal sound uttered by speaker A1 is $X(\omega)$, the vocal sound $X(\omega)$ will be collected by the microphones 11R and 11L. If vocal sound $X(\omega)$ is uttered and the input audio signal to the right microphone 11R is $YR(\omega)$ and the input audio signal to the left microphone 11L is $YL0(\omega)$, these input audio signals $YR(\omega)$ and $YL(\omega)$ will be expressed as follows, using transfer functions $FR(\omega)$ and $GL(\omega)$ determined by the sound propagation delay between the sound source and the microphones and the audio characteristics in the room:

$$YR(\omega)=FR(\omega)X(\omega) \qquad (1)$$

$$ULO(\omega)=GL(\omega)X(\omega) \qquad (2)$$

Furthermore, the left-channel input audio signal $YLO(\omega)$ undergoes a flat delay of $C(\omega)$ at the delay circuit 31 that assures the law of causality at the estimating circuit 32. This enables the left-channel input audio signal $YLO(\omega)$ to be expressed by $YL(\omega)$ as follows, using a transfer function $FL(\omega)$ including the delay circuit 31:

$$\begin{aligned}YL(\omega) &= C(\omega)GL(\omega)X(\omega) \\ &= FL(\omega)X(\omega)\end{aligned} \qquad (3)$$

This left-channel input audio signal $YL(\omega)$ is inputted to the subtracter circuit 33. On the basis of the following equation (4), the estimation circuit 32 estimates a transfer function $G(\omega)$ to obtain the left-channel audio signal $YL(\omega)$ from the right-channel audio signal $YR(\omega)$, using the right-channel audio signal $YR(\omega)$ and the left-channel audio signal $YL(a)$, and then generates an estimated transfer function $Gp(\omega)$ from the transfer function $G(\omega)$:

$$G(\omega)=GL(\omega)/FR(\omega) \qquad (4)$$

Specifically, the estimated transfer function $Gp(\omega)$ for the transfer function $G(\omega)$ is generated as follows.

Figure 4A:
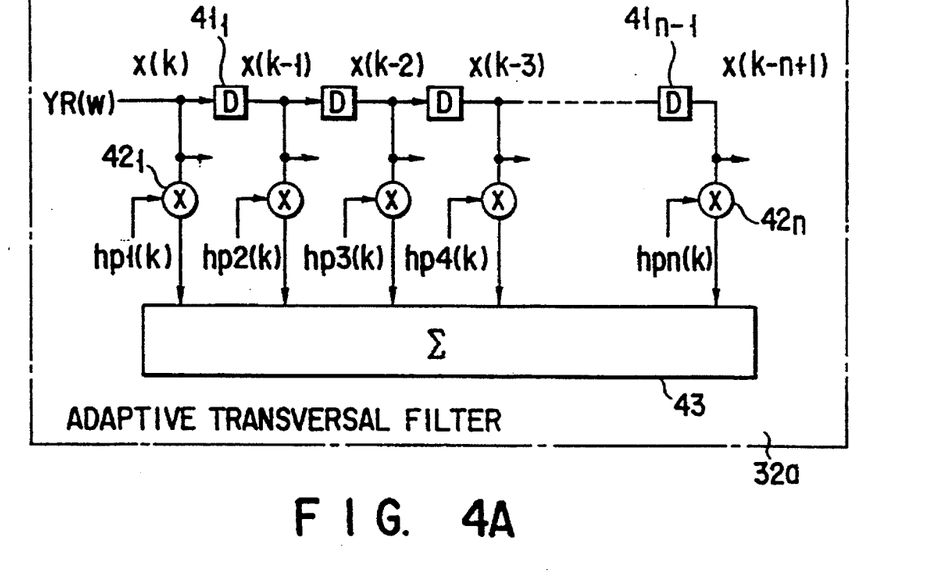
FIG. 4A and FIG. 4B are circuit diagrams of the sound source position estimating circuit of FIG. 3.
Figure 4B:
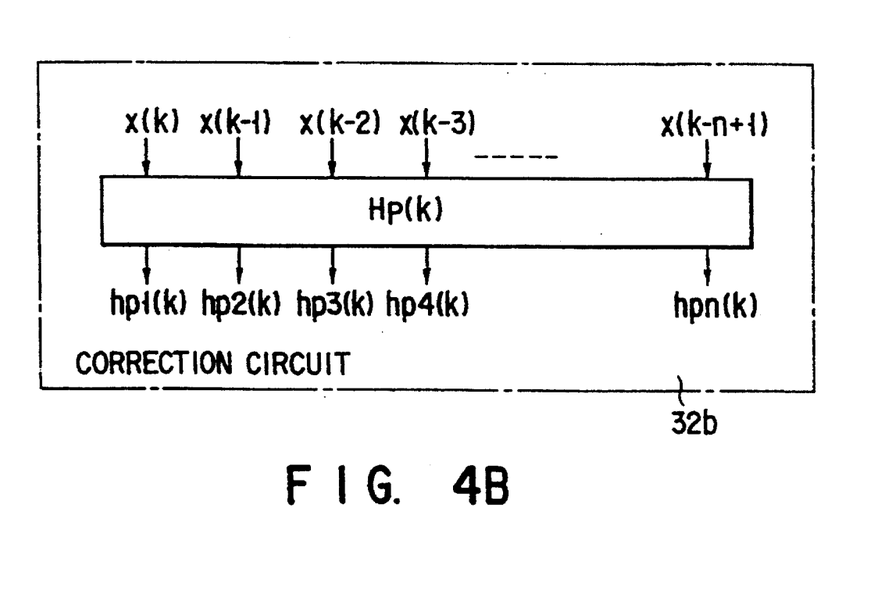

Using the right-channel audio signal $YR(\omega)$, the estimating circuit 32 calculates an estimated left-channel audio signal $yp(\omega)$ for time areas. The estimating circuit 32 includes an adaptive transversal filter 32a for computing an estimated left-channel audio signal $yp(k)$ for time areas as shown in FIG. 4A and a correction circuit 32b for constantly updating an estimated impulse response series $Hp(k)$ for the transfer function $G(\omega)$ as shown in FIG. 4B. The adaptive transversal filter 32a and the correction circuit 32b operate in synchronization with a system clock supplied from a clock generator (not shown). The adaptive transversal filter 32a comprises: n-tap shift registers $41_1$ to $41_{n-1}$ for sending the input audio signal $YR(\omega)$ continuously and converting right-channel audio signals $x(k)$ to $x(k-n+1)$ into the values for the individual time components; multipliers $42_1$ to $42_n$ for multiplying, component by component, the estimated impulse responses $hp1(k)$ to $hpn(k)$ for the individual time components corrected at the correction circuit 32b by the right-channel audio signals $x(k)$ to $x(k-n-1)$ obtained by way of the shift registers $44_1$ to $44_{n-1}$; and an adder 43 for finding the sum ($\Sigma$) of the multiplication results and obtaining an estimated left-channel audio input signal $yp(k)$.

Specifically, the correction circuit 32b performs an operation using equation (10) (explained later) to obtain estimated impulse response series $hp1(k)$ to $hpn(k)$, divides them by time component, and gives them to the corresponding multipliers $42_1$ to $42_n$ in the adaptive transversal filter 32a. The multipliers $42_1$ to $42_n$ multiply, component by component, estimated impulse response series $hp1(k)$ to $hpn(k)$ by the right-channel audio signals $x(k)$ to $x(k-n+1)$ obtained by way of shift registers $41_1$ to $41_{n-1}$, and thereby obtain estimated left-channel audio signals by time component. The adder 43 adds up these estimated left-channel audio signals for the individual time components and obtains an estimated left-channel audio signal $yp(k)$. In such an estimating circuit 32, the right-channel audio signal $x(k)$ is inputted to n stages of shift registers $41_1$ to $41_{n-1}$ which have a delay of one sample time per stage, and thereby a time series vector expressed by equation (5) is produced:

$$X(k)=(x(k), x(k-1), \ldots, x(k-n+1))^T \qquad (5)$$

where $(\ )^T$ indicates a transposed vector.

On the other hand, an estimated impulse response series $Hp(k)$ approximated to the estimated transfer function $Gp(\omega)$ in time areas is expressed by equation (6):

$$Hp(k)=(hp1(k), hp2(k), \ldots, hpn(k))^T \qquad (6)$$

An estimated left-channel audio signal $yp(k)$, or an estimated value of the left-channel audio signal $y(k)$, can be obtained using the following equation (7):

$$yp(k)=Hp(k)^T \cdot X(k) \qquad (7)$$

Here, when the impulse response series H for transfer function $G(\omega)$ is expressed by equation (8) (where n is an integer), this means that the transfer function is estimated satisfactorily.

$$H=(h1, h2, \ldots, hn)^T \qquad (8)$$

Therefore, when the estimated impulse response series $Hp(k)$ becomes:

$$Hp(k)=H \qquad (9)$$

the estimated left-channel audio signal $yp(k)$ approximates the actual left-channel audio signal $y(k)$ very closely.

Accordingly, such an estimated transfer function $Gp(\omega)$ as becomes a transfer function $G(\omega)$ providing the relationship expressed by equation (9) has only to be found. This means that such an estimated impulse response series $Hp(k)$ as allows the estimated transfer function $Gp(\omega)$ to become a transfer function $G(\omega)$ has only to be estimated.

The estimation of the estimated impulse response series $Hp(k)$ at the estimating circuit 32 is effected in such a manner that in the adaptive transverse filter 32a, for example, the correction circuit 32b performs the following operation continuously, using the time series vectors $x(k)$ to $x(k-n+1)$ obtained as inputs and outputs of the n stages of shift registers $41_1$ to $41_{n-1}$:

$$Hp(k+1)=Hp(k)+\alpha \cdot e(k) \cdot X(k)/\|X(k)\|^2 \qquad (10)$$

where $Hp(0)=0$

This algorithm is a known learning identification method. In equation (10), if $e(k)$ is the output of the subtracter circuit 33 of FIG. 3 and the estimated left-channel audio signal is $yp(k)$, the output $e(k)$ will have the relationship expressed by equation (11):

$$e(k)=y(k)-yp(k) \qquad (11)$$

This means that the output $e(k)$ of the subtracter circuit 33 is the difference signal between the left-channel audio signal $y(k)$ and the estimated left-channel audio signal $yp(k)$. In equation (10), $\alpha$ is a coefficient determining the converging speed and the stability of equation (10), and indicates the difference in distance between the left and right microphones 11L and 11R.

Thus, in the picture estimation coding section 10, the position of the left and right microphones 11L and 11R is found out from the picture data stored in the image memory 16, and then the difference in distance α is determined. Using this distance difference and the output e(k) of the subtracter circuit 33, the correction circuit 32b performs an operation according to equation (10) and thereby estimates an estimated impulse response series Hp(k).

Based on the estimated impulse response series Hp(k) obtained through the above processing, the sound source estimating circuit 34 estimates the position of the sound source. The estimation is performed as follows.

It is assumed that the term whose coefficient is the largest of the coefficients of the estimated impulse response series Hp(k) is Mx. Here, if the sampling period is T (sec), the speed of sound is v (m/sec), and the number of taps is n, the difference in distance α between the sound source and each of the left and right microphones 11L and 11R can be estimated using the following equation (12):

$$\alpha = v \cdot T(Mx - N/2) \quad (12)$$

Figure 5:
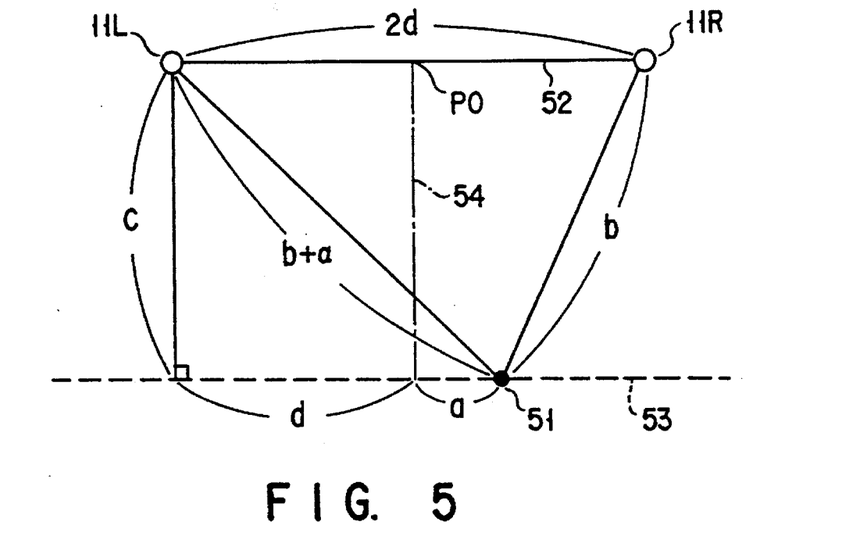
FIG. 5 is a drawing to help explain how the sound source position estimating circuit of FIG. 3 makes estimation.

Here, as shown in FIG. 5, the left and right microphones 11L and 11R are linked to each other with a straight line 52, and a straight line 53 parallel to the line 52 is imagined. Then, it is assumed that the sound source 51 is positioned at a specific distance away from the left and right microphones 11L and 11R on the line 53. If the distance from the intersection of a line 54 passing perpendicularly through the mid-point Po between the left and right microphones 11L and 11R on the line 52 to the sound source 51 is "a," the linear distance from the right microphone 11R to the sound source 51 is "b," the length of a perpendicular line between the line 53 passing through the sound source 51 and the line 52 passing through the microphones 11L and 11R is "c," and the distance between the microphones 11L and 11R is 2d, the following simultaneous equations hold:

$$(b+a)2 = (d+a)2 + c2$$

$$b2 = (d-a)2 + c2 \quad (13)$$

By eliminating b from the simultaneous equations and solving for "a," the position of the sound source Pa can be estimated.

When data on the sound source position Pa thus estimated is inputted to the picture coding section 15 via the sound source position information storage section 14, a picture area centered at the sound source is determined to be the important coding area, and the picture data corresponding to this area is encoded with a greater amount of codes that the picture data for the other areas. The encoding will be explained in detail.

Figure 6:
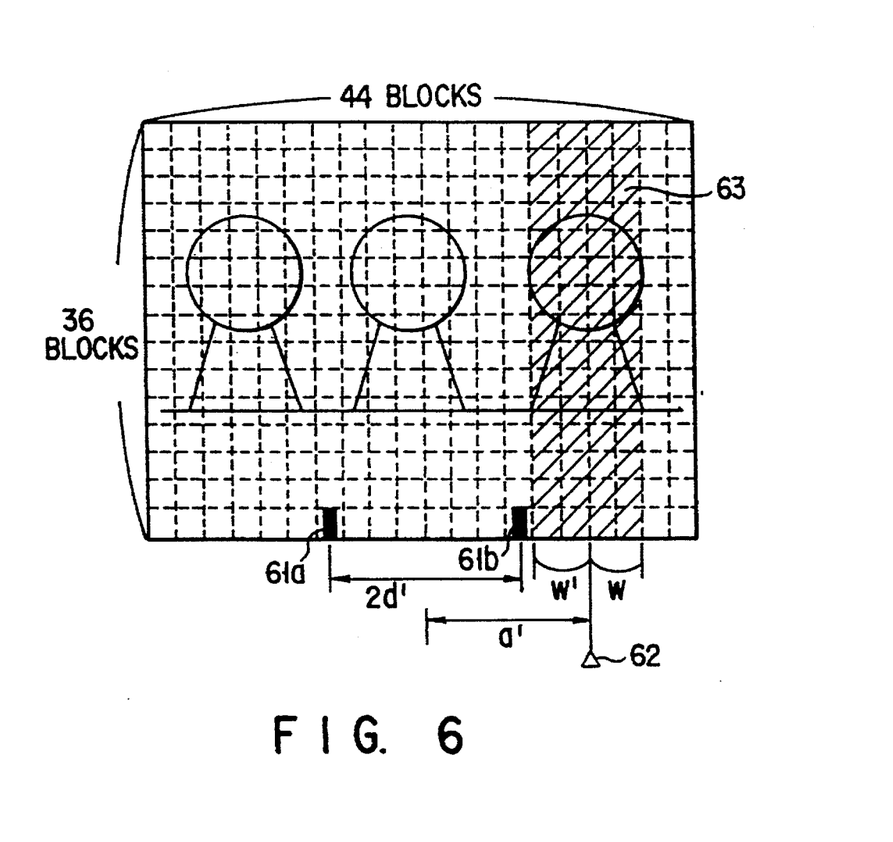
FIG. 6 is a drawing to help explain how the picture coding section of FIG. 1 determines the important coding area.
Figure 7:
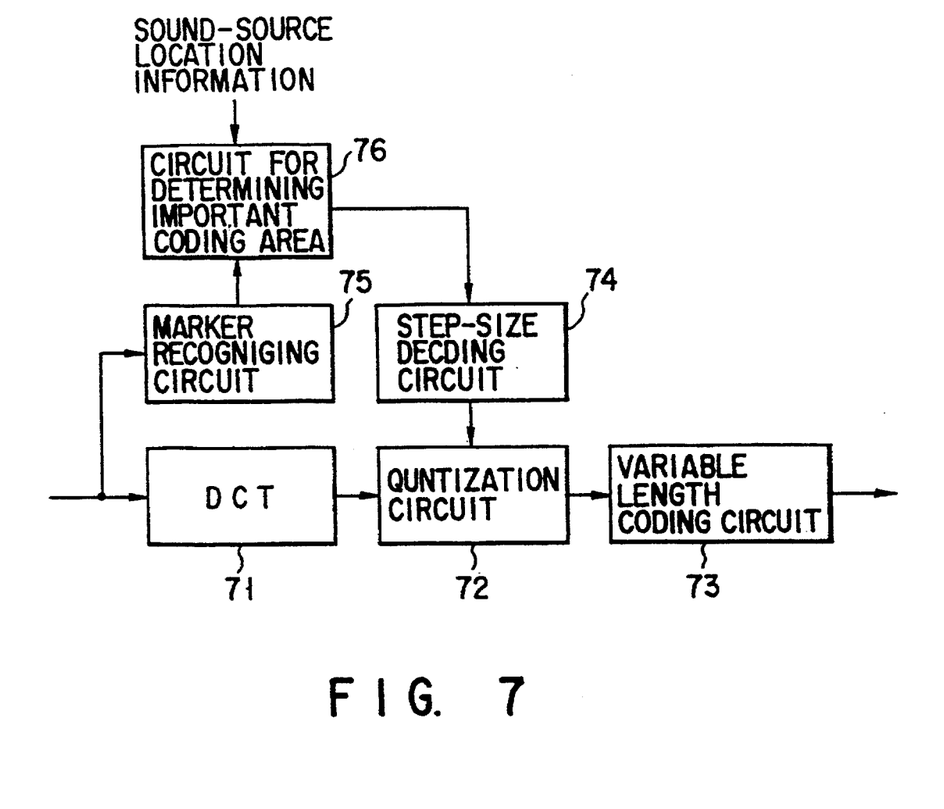
FIG. 7 is a block diagram of the picture coding section of FIG. 1.

The image memory 16 stores a frame of picture data, which is divided into, for example, 44×36 blocks, each block consisting of 8 pixels×8 lines, as shown in FIG. 6. The picture data stored in the image memory 16 is sent to the picture coding section 15 in blocks one after another. The picture coding section 15 comprises an orthogonal transform (DCT) circuit 71 connected to a read-out terminal of the image memory 16, a quantization circuit 72 connected to the output terminal of the DCT circuit 71, a variable length coding circuit 73 connected to the output terminal of the quantization circuit 72, and a quantization step size deciding circuit 74 connected to the control terminal of the quantization circuit 72. The picture coding circuit 15 further comprises a marker recognizing circuit 75 and an important coding area deciding circuit 76. The marker recognizing circuit 75 recognizes two markers 61a and 61b placed so as to correspond to the left and right microphones 11L and 11R on the basis of the picture data read from the image memory 16, and determines the distance 2d' between the microphones 11L and 11R on the screen. The markers are entered by the operator in the apparatus when the microphones are arranged in the conference room.

When information on the determined distance 2d' is inputted to the important-coding-area deciding circuit 76, the circuit 76 obtains the distance "a'" from the mid-point of the distance 2d' to the position of the speaker 62 on the basis of the distance (2d') information and the sound source position information read from the sound source position information storage section 14, using the following equation 14.

$$a' = a \cdot d'/d \quad (14)$$

Furthermore, the important-coding-area deciding circuit 76 determines an area 63 with a preset width of 2w' centered at the speaker's position 62 to be the important coding area. When information on the important coding area is inputted to the step size deciding circuit 74, the step size deciding circuit 74 determines a step size for encoding the picture data about the important coding area at a higher coded bit rate than the picture data about the other areas. When information on the determined step size is inputted to the quantization circuit 72, the quantization circuit 72 quantizes the picture data read from the image memory 16 and subjected to orthogonal transform at the DCT circuit 71 in the determined step size, or with the determined coded bit rate. In this case, quantization is effected in the step size determined at the time when the picture data corresponding to the important coding area 63 is inputted to the quantization circuit 72, whereas the picture data about the other areas is quantized in a rougher step size than the picture data about the area 63. The quantized picture data is subjected to variable length coding at the variable length coding circuit 73, which outputs the coded picture data.

When the picture data thus encoded is sent to the reception side and is displayed on a reception monitor, the image of the speaker is displayed at higher resolution than the other images.

While in the above embodiment, it has been explained that only information on the sound source is stored in the sound source position information storage section 14, time information may be stored as follows.

Specifically, the sound source position estimating section 13 causes the sound source position estimating circuit 34 to estimate the sound source position Pa on the basis of the term whose coefficient is the largest of the coefficients of the estimated impulse response series Hp(k). The information on the sound source position Pa estimated at the sound source position estimating section 13 and the time at which the estimation was effected are stored in the sound source position information storage section 14 under the control of a control unit (not shown). At this time, when the sound source position Pa(t) time t ago is within a specific width of w from the latest sound source position Pa to the right and to the left, the control unit controls the sound source position information storage section 14 so that the stored information about the past sound source position Pa(t) may be erased from the storage section 14. This allows the storage section 14 to store the position of the current speaker and the last position of each of the persons (N persons) who spoke in the past as follows:

$$
\begin{array}{ll}
T(1), & L(1) \\
T(2), & L(2) \\
\cdot & \cdot \\
\cdot & \cdot \\
\cdot & \cdot \\
T(N), & L(N)
\end{array}
$$

provided that $T(1) < T(2) < \ldots < T(N)$ (15)

where T(i) is the time elapsed since speaker i uttered a vocal sound last, L(i) is the data indicating the position where speaker i uttered a vocal sound last, T(1) is the time at which the above operation is performed by the sampling of the vocal sound of the current speaker, and L(1) is the data indicating the position where the current speaker uttered a vocal sound.

The picture coding section 15 encodes a picture as described above, on the basis of the information on the position L(1) of the latest speaker stored in the sound source position information storage section 14.

It is assumed that the coded bit rate for the entire screen is M, the width of the entire screen is $W_L$, the importance of the important coding area for speaker i is R(i), and the importance of the areas other than the important coding area is R(0). At this time, importance R(i) and R(0) can be set freely. If greater importance is given to a person who spoke more recently, setting can be effected as follows:

$$R(1) > R(2) > \ldots > R(N) > R(0) \quad (16)$$

At this time, importance is allocated so that coded bit rate M(i) for the important coding area for the latest speaker (the picture area for the latest speaker), and coded bit rate M(0) for the areas other than the important coding area may be expressed as:

$$M(i) = M \cdot w' \cdot R(i)/RT$$

$$M(0) = M \cdot (W_L - N \cdot w') R(0)/RT$$

Where RT is expressed as:

$$RT = w'(R(1) + R(2) + \ldots + R(N)) + (W L - N \cdot w') R(0) \quad (17)$$

Therefore, by allocating a somewhat larger coded bit rate M(i) to the important coding area for speaker i and the remaining coded bit rate M(0) to the other areas and carrying out an encoding operation within the allocated ranges, encoding can be effected so that an area centered at the position of the speaker may be displayed more clearly. Consequently, although the total coded bit rate per screen does not differ from that in a conventional equivalent, a subjective picture quality of the entire screen can be improved.

As described above, the position of the sound source is estimated on the basis of the channel audio signals collected by microphones arranged in different positions and the microphone position on the image screen including the microphone and speaker. This enables the picture area of the speaker on the image screen can be extracted accurately. In addition to this, allocating a larger coded bit rate to the picture area of the speaker enables the moving-picture coding system to display the picture area of the speaker clearly.

The present invention is not limited to the above embodiment, but may be practiced or embodied in still other ways without departing from the spirit or essential character thereof.

For instance, while in the above embodiment, the adaptive transversal filter for time areas is used in the estimating circuit 32 of the sound source position estimating section 13, another circuit configuration such as an adaptive transversal filter for frequency areas may be used instead. Although the estimating algorithm has been explained using a learning identification method as an example, another learning algorithm such as a steepest descent method may be used.

While in the sound source estimating circuit 34, the position of the sound source is estimated on the basis of the term whose coefficient is the largest of the coefficients of the estimated impulse response series Hp(k), another method may be used.

The method of determining the important coding area in the picture coding section 15 is not restricted to the above-described method. For instance, another method such as sensing the face area in the important coding area 63 may be used. Setting the degree of importance at the picture coding section 15 may be effected by other methods such as setting the degree of importance according to the time for which the speaker has uttered a vocal sound up to the present time, or setting the degree of importance taking into account both the time elapsed since the speaker spoke last and the time for which the speaker has uttered a vocal sound up to the present time.

In a television conference system, since the subjects almost sit still and the television screen is held at the same view angles with respect to the subjects, the subjects on the screen remain unchanged in position unless they themselves move. Therefore, by externally setting the degree of importance or the importance coding area at the picture coding section 15, a VIP can always be encoded very precisely. Because the relationship between the screen and the subject remains unchanged, it is easy to specify the speaker's face area, not the speaker's picture area. Thus, the configuration may be such that coded bit rate is allocated so as to increase the resolution of the specified face area.

While in the above embodiment, the technique of allocating a larger coded bit rate to the important coding area 63 in each frame and performing a precise coding has been explained for the coding method at the picture coding section 15, a precise coding may be effected by bringing the portions other than the important coding area 63 into a time-lapse state and thereby allocating a larger coded bit rate to the important coding area 63. The resolution may be changed according to the weighting corresponding to the order in which the speakers uttered a vocal sound, in such a manner that the highest resolution is given to the latest speaker and the lowest resolution is given to the earliest speaker in chronological order of speakers.

While in the above embodiment, two channels are used for audio inputs, three or more channels may be used. In this case, by arranging microphones so as to make a difference in height, a two-dimensional estimation of the sound source can be made. By this approach, a single point on the screen can be estimated as the sound source, thereby enabling the sound source position to be estimated at a much higher accuracy.

INDUSTRIAL APPLICABILITY

According to the above-described invention, by estimating the position of the sound source on the basis of a plurality of channel audio signals and encoding mostly the vicinity of the sound source position, it is possible to provide a moving-picture coding system which performs encoding so that the speaker may appear more clearly.

We claim:

1. A moving-picture coding apparatus comprising:

image pickup means for picking up a plurality of subjects including at least one subject specified as a sound source uttering a vocal sound and outputting a video signal;

right and left channel sound-sensitive means which comprises right and left microphones arranged from right to left with respect to said subjects and which collects sound from the subject picked up by said image pickup means and outputs audio signals for right and left channels;

estimating means which contains a delay circuit for delaying a left-channel audio signal from said left microphone, and an estimating circuit for estimating a left-channel audio signal on the basis of the delayed left-channel audio signal from said delay circuit and a right-channel audio signal from said right microphone, and which estimates the position of the sound source on the basis of the right and left channel audio signals outputted from said right and left channel sound-sensitive means; and coding means for encoding the video signal corresponding to a specific range of picture area centered at the sound source position estimated by said estimating means with a larger coded bit rate than video signals corresponding to other picture areas.

2. A moving-picture coding apparatus according to claim 1, wherein said estimating means comprises a subtracter circuit for obtaining a difference signal between the delayed left-channel audio signal from said delay circuit and the estimated left-channel audio signal from said estimating circuit, said estimating circuit estimates the left-channel audio signal as allows said difference signal to become zero when said difference signal is fed back to said estimating circuit, and a sound source position estimating circuit which estimates the position of the sound source using an estimated impulse response series outputted from said estimating circuit.

3. A moving-picture coding apparatus according to claim 2, wherein said estimating circuit comprises an adaptive transversal filter for calculating an estimated left-channel audio signal for time areas, and a correction circuit for updating the estimated impulse response series constantly.

4. A moving-picture coding apparatus according to claim 3, wherein said adaptive transversal filter comprises an n-tap shift register for shifting the right-channel audio signal consecutively and converting the audio signal into a value for each time component, a multiplier circuit for multiplying the estimated impulse response series for each time component corrected by said correction circuit by the value of the right-channel audio signal for each time component obtained by way of said shift register to obtain a plurality of multiplication results corresponding to a plurality of time components, and an adder for adding the multiplication results to obtain an estimated left-channel audio input signal.

5. A moving-picture coding apparatus according to claim 4, wherein said multiplier circuit includes a plurality of multipliers, and said correction circuit contains circuit means for obtaining an estimated impulse response series, dividing the estimated impulse response series by the time components to obtain a plurality divided impulse response series, and supplying the divided impulse response series to said multipliers of said adaptive transversal filter, respectively, said multipliers of said adaptive transversal filter multiply, component by component, an estimated impulse response series by the right-channel audio signal obtained by said shift register, and output an estimated left-channel audio signal for each time component, and said adder adds estimated left-channel audio signals corresponding to the time components to produce an estimated left-channel audio signal.

6. A moving-picture coding apparatus comprising:

image pickup means for picking up at least one subject specified as a sound source uttering a vocal sound and outputting a video signal;

a plurality of sound-sensitive means which are arranged so as to be separate from each other and which collect the vocal sound from the subject picked up by said image pickup means and output audio signals;

estimating means for estimating the position of the sound source on the basis of the audio signals outputted from said plurality of sound-sensitive means;

sound source position storage means for storing the history of information on the present and past positions of the sound source estimated by said estimating means; and coding means for encoding the video signal with coded bit rate corresponding to the position on the basis of the history of present sound source position information and past sound source position information stored in said sound source position storage means.

7. A moving-picture coding apparatus according to claim 6, wherein said coding means specifies at least one of the sound source position information stored in said sound source position storage means and its vicinity to be a high picture-quality area, sets each picture-quality level, allocates a coded bit rate so that the area may have a higher picture quality according to said picture-quality level than other areas, and encodes the video signal.

8. A moving-picture coding apparatus according to claim 6, wherein said coding means specifies a high picture-quality area and picture-quality levels in accordance with the sound source position information and encoding the video signal by allocating a coded bit rate so that the area may have a higher picture quality than other areas.

9. A moving-picture coding apparatus according to claim 8, wherein said coding means sets said picture-quality levels according to how often the sound source position appears.

10. A moving-picture coding apparatus according to claim 6, wherein said sound-sensitive means comprises right and left microphones which are arranged from right to left with respect to a plurality of subjects and which produce audio signals for right and left channels, and said estimating means comprises a delay circuit for delaying a left-channel audio signal from said left microphone, an estimating circuit for estimating a left-channel audio signal on the basis of the delayed left-channel audio signal from said delay circuit and a right-channel audio signal from said right microphone, a subtracter circuit for obtaining a difference signal between the delayed left-channel audio signal from said delay circuit and the estimated left-channel audio signal from said estimating circuit, said estimating circuit estimating such an estimated left-channel audio signal as allows said difference signal to become zero when said difference signal is fed back to said estimating circuit, and a sound source position estimating circuit which estimates the position of the sound source using an estimated impulse response series outputted from said estimating circuit.

11. A moving-picture coding apparatus according to claim 10, wherein said estimating circuit comprises an adaptive transversal filter for calculating an estimated left-channel audio signal for time areas, and a correction circuit for updating the estimated impulse response series constantly.

12. A moving-picture coding apparatus according to claim 11, wherein said adaptive transversal filter comprises an n-tap shift register for shifting the right-channel audio signal consecutively and converging the audio signal into a value for each time component, a multiplier circuit for multiplying the estimated impulse response series for each time component corrected by said correction circuit by the value of the right-channel audio signal for each time component obtained by way of said shift register to obtain a plurality of multiplication results corresponding to a plurality of time components, and an adder for adding the multiplication results to obtain an estimated left-channel audio input signal.

13. A moving-picture coding apparatus according to claim 12, wherein said multiplier circuit includes a plurality of multipliers, and said correction circuit contains circuit means for obtaining an estimated impulse response series, dividing the estimated impulse response series by the time components and supplying the divided impulse response series to said multipliers of said adaptive transversal filter, respectively, said multipliers of said adaptive transversal filter multiply, component by component, an estimated impulse response series by the right-channel audio signal obtained by way of said shift register, and output an estimated left-channel audio signal for each time component, and said adder adds estimated left-channel audio signals corresponding to the time components to produce an estimated left-channel audio signal.

* * * * *